W. A. COOK.
POWER TRANSMISSION.
APPLICATION FILED DEC. 13, 1917.
1,316,427.
Patented Sept. 16, 1919.
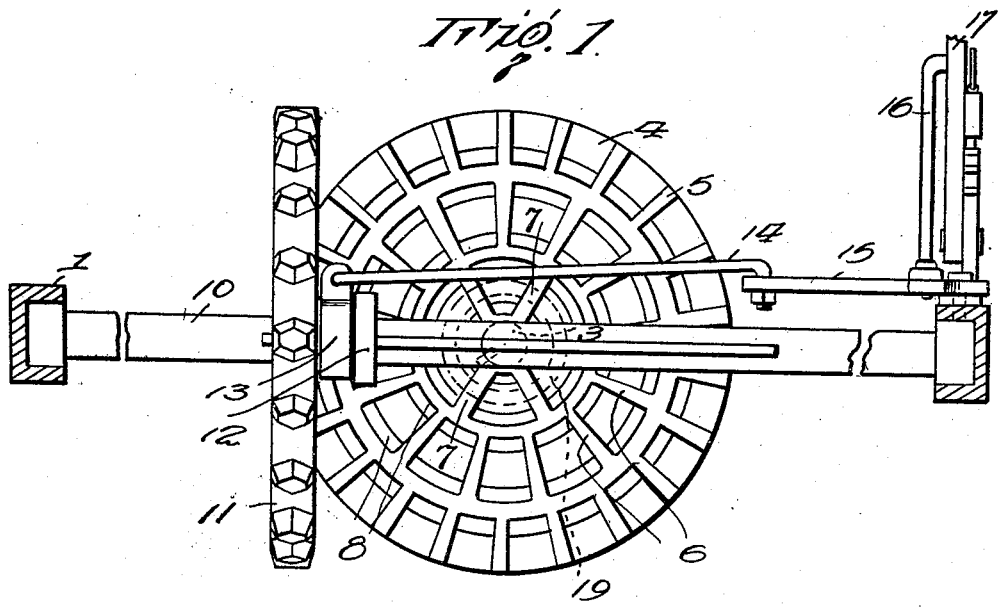
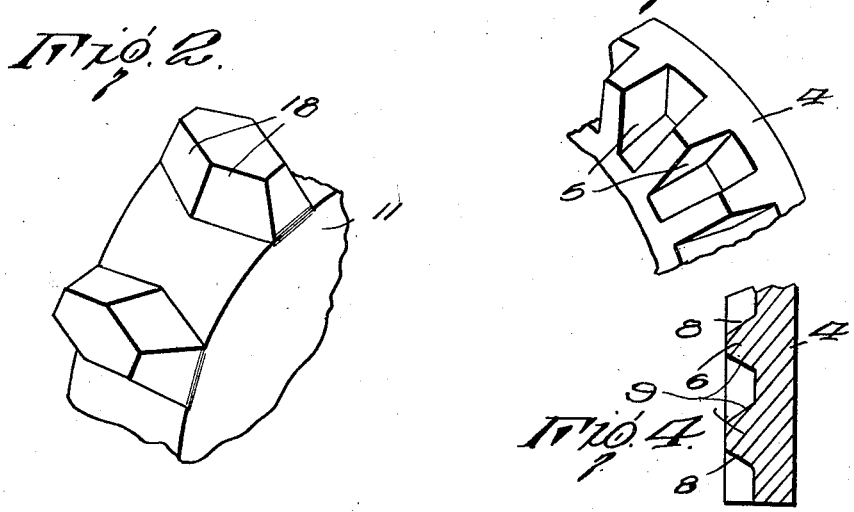
William A. Cook
Inventor
By Geo. P. Kimmel
Attorney

UNITED STATES PATENT OFFICE.

WILLIAM A. COOK, OF DUBLIN, TEXAS.

POWER TRANSMISSION.

1,316,427. Specification of Letters Patent. Patented Sept. 16, 1919.

Application filed December 13, 1917. Serial No. 206,974.

*To all whom it may concern:*

Be it known that I, WILLIAM A. COOK, a citizen of the United States, residing at Dublin, in the county of Erath and State of Texas, have invented certain new and useful Improvements in Power Transmissions, of which the following is a specification.

This invention relates to variable speed transmission and the invention has more especial reference to an improved power transmission of the slidable gear type.

The invention has for its dominant object to provide a power transmission having a novel form of gear which can be engaged at different points by the driven gear for establishing a plurality of different speed ratios, such as high, intermediate and low speeds and also reverse.

Another and equally important object of the invention is to provide a power transmission, the construction of which is such as to eliminate the intricate arrangements of gearing and to permit the desired driving relation to be quickly and easily obtained.

Among other aims and objects of the invention may be recited, the provision of a device of the character mentioned with a view to compactness and in which the number of parts are few, the construction simple, the cost of production comparatively small, and efficiency and operation high.

The foregoing together with additional advantageous details and arrangement of parts of the preferred embodiment of my invention will be clear from the specific description hereinafter contained, when read in connection with the accompanying drawings forming part thereof, wherein said embodiment of the invention is illustrated for the purpose of facilitating a full understanding of the present improvements.

In the drawings:—

Figure 1 is a transverse section through a vehicle chassis showing the transmission in elevation, Fig. 2 is a fragmental detail in perspective of the driven gear, Fig. 3 is a similar view of the driving gear, and, Fig. 4 is a fragmental section through the driving gear.

Having more particular reference to the drawings and in connection with which like reference characters will designate corresponding parts throughout the several views, 1 represents the chassis of a motor driven vehicle or the like, the same being provided with transversely disposed supporting bars not shown which supporting bars have bearing openings formed in the intermediate portions thereof for rotatably receiving a driving shaft 3, which driving shaft, in turn, is connected to the engine of the vehicle, not shown.

Mounted upon the free end of the driving shaft 3 is a variable speed power transmitting gear 4, which gear as will be noted, has a plurality of gear teeth 5 formed adjacent the marginal portions thereof, while other sets of gear teeth 6 and 7 are provided by recessing portions of the outer face of the said gear 4, it being noted in this connection, that the various sets of gear teeth 5, 6 and 7 are concentrically arranged. It is to be also noted, that the opposite end walls of the various gear teeth are beveled as at 8 and 9 for a purpose which will be subsequently described.

Journaled in bearings in the chassis 1 and arranged transversely of the same is a driven shaft 10, which shaft has splined thereto a driven gear 11 carrying a collar 12 with which a yoke member 13 is engaged, the said yoke member receiving one end of a connecting rod 14 while the remaining end of the rod is engaged with one end of a bell crank lever 15 mounted upon the chassis, the remaining end of said lever being engaged by a second connecting rod 16 extending forwardly of the chassis into connection with an operating lever 17. It is to be noted, that the operating lever 17 is arranged at a point convenient to the operator of the vehicle and is provided with the usual quadrant and slidable pawl in order that the same may be securely held in adjusted positions. Attention is directed to the fact, that the teeth of the gear 11 are substantially diamond shape in cross section, that is the opposite ends of the same are tapered as at 18. Hence, the gear may be effectually engaged with the various sets of teeth 5, 6 and 7 upon either side thereof, thus permitting the obtaining of different speed ratios either in forward or reverse directions.

In operation, to establish high speed, the lever 17 is rocked thereby causing movement of the bell crank lever and the connecting rod 14, which as a consequence will move the driven gear 11 over the driven shaft into engagement with the outermost set of teeth 5. Should it be desired to shift to intermediate or low speed, the driven gear 11 is moved toward the center of the driving gear 4 by again operating the lever 17. Due to the beveling of the end walls of the various sets of teeth, it will be readily understood that the teeth of the driven gear 11 will be permitted to readily disengage themselves and to move into engagement with other sets of teeth on the said driving gear. Furthermore, to permit proper disengagement and engagement of the teeth of the driving and driven gears, slight sliding movement of the driving gear is permitted against the tension of an expansible coil spring 19 arranged about the adjacent end of the driving shaft and having bearing on the driving gear. It is to be noted in this connection, that the driving gear is splined to the free end of the driving shaft, thereby permitting movement of the same.

To obtain a reverse drive, it is only necessary to move the driven gear to the opposite sides of the various sets of gear teeth 5, 6 and 7.

Manifestly, the construction shown is capable of considerable modification and such modification as is within the scope of my claim, I consider within the spirit of my invention.

I claim:—

In combination with right angularly arranged driving and driven shafts, a disk mounted on the driving shaft having a circular series of radial gear teeth receiving recesses formed in one face thereof, certain of the side walls of the recesses being beveled, and an axially movable gear wheel mounted on the driven shaft and having the teeth thereof formed with tapered ends and opposed substantially V-shaped working faces for engagement with certain of the walls of the gear teeth receiving recesses during transmission of rotary motion from the disk to the gear wheel, the inward movement of the gear tooth toward the axis of the driving disk being limited by engagement of the gear teeth with the inner walls of the teeth receiving recesses.

In testimony whereof, I affix my signature hereto.

WILLIAM A. COOK.

Copies of this patent may be obtained for five cents each, by addressing the "Commissioner of Patents. Washington, D. C."